(No Model.)

F. A. DODGE.
REFRIGERATING APPARATUS.

No. 291,166. Patented Jan. 1, 1884.

WITNESSES:
Jas. F. DuHamel
H. J. Schneider

INVENTOR.
Frances A. Dodge,
by Dodge & Son,
Attys.

UNITED STATES PATENT OFFICE.

FRANCES A. DODGE, OF BRADY, TEXAS.

REFRIGERATING APPARATUS.

SPECIFICATION forming part of Letters Patent No. 291,166, dated January 1, 1884.

Application filed September 19, 1883. (No model.)

*To all whom it may concern:*

Be it known that I, FRANCES A. DODGE, of Brady, in the county of McCulloch and State of Texas, have invented certain Improvements in Refrigerating Apparatus, of which the following is a specification.

My invention relates to refrigerating or cooling apparatus for cooling purposes generally; and it consists, essentially, in a series of vessels surrounded or enveloped by fibrous material, dipping into a water-vessel above, and serving to maintain a constant supply of water to the exterior of the vessels through capillary action, the water being caused to pass down in such quantity as to drip from the bottoms of the vessels and collect in a second tank supplying a second series of vessels in the same manner, and finally to collect in a suitable vessel below, intermediate filtering apparatus being provided or not, as required.

Figure 1:
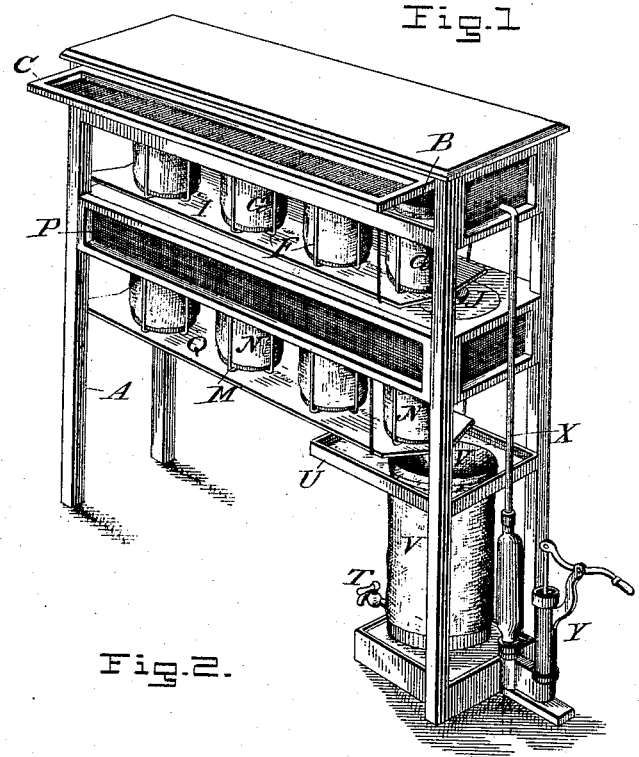
Figure 2:
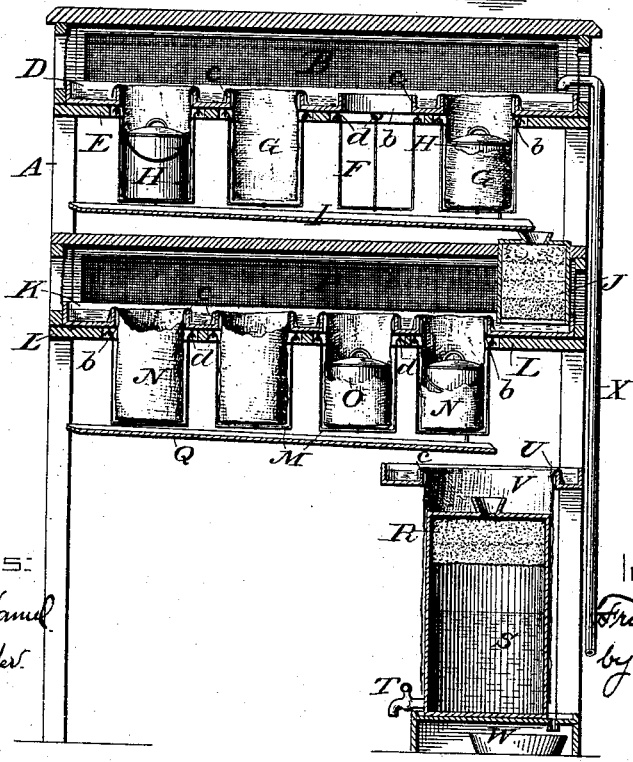

In the accompanying drawings, Figure 1 represents a perspective view of my improved apparatus in a preferred form; Fig. 2, a vertical longitudinal section of the same.

This invention is the result of experience in a warm climate, and is especially designed to meet the requirements of the southwestern territory of this country, where, as is well known, a great scarcity of good water exists, and the heat is so great as to preclude the possibility of keeping milk, butter, and like products sweet for any considerable time. In the section referred to, nearly all the water used is hauled a considerable distance, occasionally from streams, but oftener from standing pools and ponds, and as at first procured is unfit for drinking, cooking, or washing purposes, not only on account of its warmth, but also because of its impurities.

The object of my invention is to cool the water, and in doing so to cool such other bodies as it may be desirable to cool, and, further, by the same operation, to purify the water, so that after passing through the apparatus and performing the work required of it the water is delivered into a suitable receiver, cool and pure, and relieved to a great extent of the hardness which it possesses when first collected.

The actual embodiment of this invention may be considerably varied; but for ordinary domestic use I prefer the form shown in the annexed drawings, in which—

A represents a suitable frame, of wood or other suitable material, covered at the top, and having at its upper portion a compartment, B, closed in with wire-gauze, netting, or other open material, *a*, adapted to keep out dirt and insects, one side of the compartment being provided with a hinged door, C, to afford access to the interior, as indicated in Fig. 1.

At the bottom of the compartment B is a pan, D, filling the interior of the frame from end to end and from side to side, said pan being suitably supported by a board or platform, E. The pan is formed with a series of openings, *b*, which continue also through the platform E, and around each of these openings is formed a vertical wall or flange, *c*, nearly or quite as high as the sides of the pan, so that water may stand in the pan to the height of the flanges or walls without escaping through the holes or openings. Beneath each opening is suspended a wire cage or frame, F, which may consist, merely, of two wires bent into U form, and having their upper ends fashioned into hooks to engage with eyes or staples *d* in the lower side of the platform E, as shown in Fig. 2.

G represents a bag, or it may be an open-ended jacket of flannel or any other suitable fibrous material, one end of which is arranged within each cage or frame F, with its upper end curled over the flange or wall *c*, so as to hold the bag or jacket in place, and also to cause the edge of the material to dip into the water of the pan D all around, so as to absorb and draw up the water therefrom and carry it over the flange *c* and down the sides to the bottom of the bag or jacket. Within each bag or jacket is placed a bucket or vessel, H, which may advantageously be made of tin, and of a size to readily enter but to closely fill the body or jacket, though preferably shorter in length, as indicated in Fig. 2. If it be desired to remove one of the vessels, the door C is opened and the vessel is raised up through the opening *b*, or the lid or cover of the vessel may be raised and the contents of the vessel removed as required. The water in flowing down the sides of the bag or jacket encounters the warm air, and in the section of country referred to will generally meet also with a breeze, which causes, independently or jointly, effect a rapid evaporation of a portion of the water, and a consequent cooling of the vessels and their contents. This idea of cooling vessels by evaporation of water held by a surrounding jacket is not, of course, broadly claimed, because it has been for many years a common practice in tropical climates to thus cool water; but the arrangement and construction of my apparatus utilizes this principle in a very efficient manner. The jackets or bags may be made of thick material, as felt, heavy woolen fabrics, knit goods, or other material suited to the purpose; but whatever is used should have sufficient body to raise a considerable body of water over the flanges c and cause it to flow down the sides of the jackets, so that while a portion is evaporated to effect the cooling a considerable percentage will flow down unevaporated, and drop from the bottoms of the jackets upon a trough or conductor, I, placed to receive it, and inclined to deliver it to a filter, J. In passing by capillary attraction through the jackets or fibrous material, the water carries with it but a very slight percentage of the impurities contained in it in the first instance, and consequently, as it drips or flows upon the trough or conductor I, it is materially purer than when supplied to pan D, not only the dirty matters but also considerable of the alkaline matter common to such water being thus removed. The water is likewise materially cooler when it reaches the conductor than that in the pan above, because it has passed through the fibrous jackets, which are cooled by the evaporation of a portion of the water, as already explained. Thus I accomplish at the one operation, and by a continuous and automatic action, the cooling and purification of the water and the cooling of whatever may be contained in the vessels H. Since it is difficult to completely purify very dirty water by thus passing it once through the jackets, I provide also the filter J, as above mentioned. This filter may be of any ordinary construction—conveniently a vessel provided at the bottom with a layer of charcoal, next a layer of clean sand, then a layer of pebbles, and, finally, a layer of pieces of broken brick free from dust and fine matter. The particles of brick and gravel may be mixed, if desired. From the filter the water falls into a second pan, K, in all respects similar to the pan D, supported by a board or platform, L, and provided with cages M, jackets N, and vessels O, and inclosed by a wire-gauze guard, P. Owing to the preliminary cooling of the water above, the cooling action will be greater in the lower tier of vessels, and the water will be cooler as it falls from the jackets N upon the conductor Q than in falling upon conductor I, and having passed through the filter J and second series of jackets it will also be much more pure. In order, however, to render the water absolutely pure, or as nearly so as is practicable without distillation, I prefer to conduct the water from trough Q into a second filter, R, constructed in substantially the same manner as the first, but with finer or more closely-packed materials, said filter being furnished at the bottom with a pure-water chamber, S, from which the water may be drawn by a tap or faucet, T.

U represents a third pan, shorter than the others, but constructed in the same manner, with a flange or wall, c, over which is turned the mouth or upper end of a jacket, which serves to supply water to the exterior of the filter and receiving-tank R, and to keep its contents cool by reason of the evaporation of a part or the whole of the water thus supplied. Should any of the water, however, drop from this jacket, it will be caught by a vessel, W, provided for the purpose. A pipe, X, and a pump, Y, may be used to supply water to the pan D, and also to pan U, if desired; or the water may be contained in an elevated tank provided with an outlet-cock arranged to deliver to the pan or pans.

It is obvious that the pans and their attendant parts may be multiplied to any extent desired; but the drawings represent and the description explains an apparatus such as I have used with marked success, and which is well adapted for ordinary domestic use, having proven capable of cooling an abundant supply of water and of preserving butter and milk for a good-sized family.

Either or both of the filters J may be omitted, if desired.

Having thus described my invention, what I claim is—

1. In a cooling apparatus, the combination of a water-pan provided with a walled opening in its bottom, a cage or frame suspended beneath said opening, a fibrous jacket curled over the wall of said opening and extending downward into the cage, and a vessel placed within said cage and jacket and adapted to receive the matter to be cooled.

2. In combination with pan D, having openings b and flanges c, cages F, suspended beneath the pan, jackets G, having their upper edge turned over the flanges c and into the pan, and vessels H within the jackets and cages, all substantially as shown and described.

3. In combination with the pan D and the jackets G, extending downward therefrom, vessels H within the jackets, and a trough or conductor, I, beneath the jackets, to catch the drip therefrom and conduct it to a suitable receptacle.

4. In combination with an upper water-pan, a fibrous jacket dipping therein and suspended therefrom, and a vessel arranged within said jacket, a second pan, jacket, and vessel below the first, said second pan being arranged to receive the water dipping from the jacket of the first, whereby the second vessel is supplied with water already partially cooled.

5. In combination with an upper water-pan, one or more jackets dipping into and suspended therefrom, and a vessel or vessels arranged within the jackets, a second water-pan, jacket or jackets, and vessel or vessels below the first, and an intermediate filter, substantially as and for the purpose set forth.

6. The herein-described cooling apparatus, consisting of frame A, pans D K U, cages F M, jackets G N, vessels H O, and filters J R, the latter provided with water-chamber S, and with porous jacket V, all substantially as shown and described.

7. In a cooling apparatus substantially such as described, the combination of a frame having its sides covered with gauze and provided with a door, a water-pan placed within the inclosed space, and having openings through which to insert and remove vessels, a cage or support for the vessels beneath the pan, and a fibrous jacket encircling the vessel and dipping into the pan, all substantially as shown and described.

FRANCES A. DODGE.

Witnesses:
CHAS. BOWERS,
W. McSHAN.